United States Patent [19]

Higley

[11] Patent Number: 4,968,568
[45] Date of Patent: Nov. 6, 1990

[54] THERMAL BATTERY WITH COMPOSITE ANODE

[75] Inventor: Lin R. Higley, Costa Mesa, Calif.

[73] Assignee: Hughes Aircraft Company, Los Angeles, Calif.

[21] Appl. No.: 416,685

[22] Filed: Oct. 3, 1989

[51] Int. Cl.[5] .............................................. H01M 4/36
[52] U.S. Cl. .................................... 429/104; 429/102
[58] Field of Search ............... 428/650, 649, 615, 614; 429/104, 218, 102

[56] References Cited

U.S. PATENT DOCUMENTS 4,515,874 5/1985 Steinleitner ........................ 429/104

Primary Examiner—Anthony Skapars
Attorney, Agent, or Firm—M. E. Lachman; W. K. Denson-Low

[57] ABSTRACT

An improved thermal battery having a sodium composite electrode and a cathode separatd by a porous separator. The sodium composite electrode includes sodium metal and a protective metal which is effective in protecting the sodium metal from reaction with water or air. This sodium composite structure is useful in other systems besides batteries, in order to control the reactivity of sodium.

30 Claims, 2 Drawing Sheets

THERMAL BATTERY WITH COMPOSITE ANODE

This invention was made with United States Government support under Contract No. F33615-87-C-2727 awarded by the Department of the Air Force. The United States Government has certain rights in this invention.

BACKGROUND OF THE INVENTION

1. Field of the Invention

The present invention relates generally to advanced technology thermal battery systems. More particularly, the present invention relates to sodium-sulfur thermal batteries for use in providing a high-power density electrical energy source. The present invention also relates to sodium composite structures which are useful in such batteries.

2. Description of Related Art

The sodium-sulfur battery was first introduced in the mid 1960's. Since that time, there has been a great deal of interest in developing cell designs which are suitable for a wide variety of applications. Batteries which have been under development include those for use in automobiles and train locomotives. One such battery is described by J. L. Sudworth in the publication entitled "Sodium/Sulfur Batteries for Rail Traction," in the Record of the Tenth Intersociety Energy Conversion Engineering Conference, 1975, pages 616–620.

Cell designs have also been investigated for producing batteries for storage of electricity for delayed use in order to level out the production rate of electricity and for space systems requiring high energy density. The sodium-sulfur battery is used as a secondary, that is, rechargeable battery. Its use as a primary (one-time discharge) battery would be unwarranted because of the cost, complexity and fragility involved in edge-sealing and incorporating a ceramic solid electrolyte into a battery design. In addition, there are other relatively inexpensive primary batteries of higher power density available in the marketplace.

The typical sodium-sulfur electrochemical cell includes a molten metallic sodium anode, a sodium ion conducting ceramic solid electrolyte and a molten sulfur electrode. The sodium-sulfur cell usually operates at a relatively high temperature (300°–400° C.) in order to maintain not only the sulfur and sodium, but also their reaction products, in a molten state. The solid electrolyte is a critical part of the cell configuration because it must also provide separation of the liquid sodium from the liquid sulfur in order to prevent catastrophic cell failure. Finding a suitable solid electrolyte has been a difficult task because of the high conductivity required for a high power density battery.

Solid electrolytes which have been used in sodium-sulfur batteries include beta"-alumina and other sodium ion conducting ceramic or glass. Beta"-alumina has become the most popular solid electrolyte. However, a problem with all of these solid electrolytes is that they suffer from relatively low conductivity and have coefficients of thermal expansion which are not well matched to other materials used in making the cell. Accordingly, the present solid separation cell configurations are fragile and are limited to relatively low power outputs. In addition, the differences in thermal expansion between the ceramic material and other cell elements make it difficult to provide a seal around the edges of the ceramic separator. Further, the differential stresses present in the sodium-sulfur cell during operation may weaken the solid electrolyte resulting in the formation of cracks or other structural failures.

In view of the above problems associated with the present solid electrolytes, there is a continuing need to develop sodium-sulfur battery configurations wherein higher levels of conductivity are achieved through the electrolyte. In addition, new separator designs are necessary which do not have thermal expansion mismatches or sensitivity to catastrophic failure.

Another important consideration in any thermal battery is the structure and makeup of the electrodes. This is especially important in connection with sodiumsulfur batteries where the unique wetting properties and extreme reactivity of sodium metal and molten sulfur must be taken into consideration. For example, proper wetting of the molten sodium and sulfur with respect to the electrode wicks is important to proper operation of the battery. Further, the extreme reactivity of sodium metal with oxygen and moisture creates numerous problems in the battery fabrication and assembly process. Accordingly, there is a continuing need to provide improved electrode configurations wherein the above problems are reduced or eliminated. Moreover, such improved sodium-containing structures would be useful in various other applications.

In addition to the above considerations, there is an additional need for a primary battery which has high power density, long shelf-life, ruggedness, and discharge times ranging from seconds to several hours.

SUMMARY OF THE INVENTION

In accordance with the present invention, a sodium composite electrode is provided which is well suited for use in thermal batteries. The composite sodium electrode or anode includes a protective metal, such as aluminum, magnesium, zinc and alloys thereof. These protective metals are believed to oxidize and mask the sodium with an overgrowth of moisture resistant film. This characteristic makes it possible to fabricate the sodium anode and assemble a thermal battery in dry air without taking the precautions of using an inert gas environment. This protective coating also allows use of the sodium composite electrode in a wide variety of situations previously not possible due to the extreme reactivity of sodium metal.

As a feature of the present invention, the protective metal is incorporated into the sodium as a powder. The result is the formation of a sodium "clay" which can be molded into a variety of electrode shapes. In addition, the nature of the sodium composite electrode is such that the retained surface area of the sodium is high and therefore increased power density and decreased ohmic contact resistance is possible.

As another feature of the present invention, the sodium composite electrode is used as the anode in a sodium-sulfur thermal battery wherein a new electrode separator provides high ionic conduction while at the same time providing the necessary physical separation of the liquid sodium and sulfur electrodes.

The sodium-sulfur thermal battery includes a sodium composite electrode in accordance with the present invention, a sulfur electrode and a separator located between the sodium and sulfur electrodes wherein the separator has sufficient porosity to allow preliminary migration of fluid (liquid or gaseous) sodium metal and fluid (liquid or gaseous) sulfur therethrough during initial operation of the thermal battery to form a sodium polysulfide electrolyte within the separator. It is believed that the migration of sulfur and sodium into the porous separator when the cell is heated to operating temperatures for the first time produces a polysulfide gradient. This polysulfide gradient is composed of sodium sulfides having the formula $Na_2S_x$ wherein x is approximately five or less but greater than or equal to 1. The composition of the gradient is believed to be:

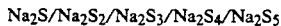

$Na_2S/Na_2S_2/Na_2S_3/Na_2S_4/Na_2S_5$ $Na_2S$ is a solid at temperatures below 1000° C. As a result, the solid $Na_2S$ provides a solid barrier which prevents migration of liquid sulfur or sodium through the entire porous separator. At the same time, the remainder of the polysulfide gradient provides levels of ionic conductivity which are not possible with the previous solid ceramic materials. The use of a porous separator in combination with a polysulfide gradient provides suitable liquid electrode separation while also providing high rates of ionic conduction and resulting high electrical power output.

In accordance with an alternative embodiment of the present invention, a sodium composite structure is provided which has reduced activity to oxygen and moisture. This composite structure comprises sodium metal and the protective metal described above.

The above-discussed and many other features and attendant advantages of the present invention will become apparent as the invention becomes better understood by reference to the following detailed description when considered in conjunction with the accompanying drawings.

DESCRIPTION OF THE PREFERRED EMBODIMENTS

Figure 1:
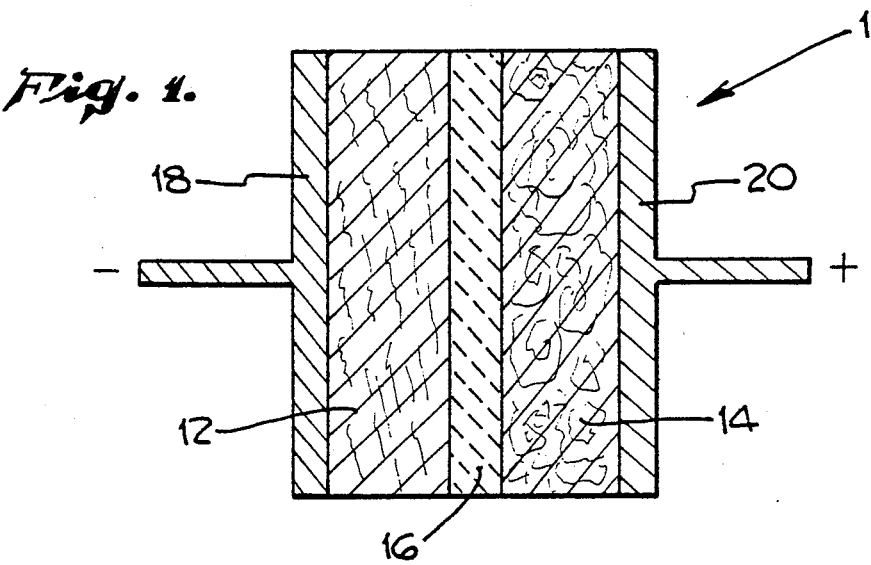
FIG. 1 is a schematic representation of an exemplary sodium-sulfur cell in accordance with the present invention.

A preferred exemplary sodium-sulfur thermal cell is shown diagrammatically in FIG. at 10. The cell 10 includes a sodium composite anode 12 and a carbon graphite felt cathode 14 which is impregnated with sulfur. The anode 12 and cathode 14 are separated by a porous oxide separator 16. Current collectors 18 and 20 are provided at the anode and cathode, respectively, for allowing removal of electrical energy from the cell 10.

Although the following description will be limited to sodium-sulfur thermal batteries, it will be understood by those skilled in the art that the sodium composite electrode of the present invention may be used in a wide variety of batteries wherein a sodium electrode is required. Accordingly, the sodium composite anode of the present invention is not limited to use in sodium-sulfur thermal batteries. In addition, the sodium electrode of the present invention can be used to replace lithium electrodes in various types of lithium primary batteries, such as those using $SO_2$ or $SOCl_2$ liquid cathodes or those using solid cathodes of $Bi_2Pb_2O_5$, $Bi_2O_3$, $(CF)_n$, CuO, CuS, FeS, $Ni_5S_2$, $MoS_2$, $MnO_2$, $Ag_2CrO_4$, $CrO_x$, $U_2O_5$, $PbI_2/PbS/Pb$, or $I_2$. While lithium provides increased energy density over sodium, sodium has the advantage of being considerably less costly than lithium and can be used where the energy density does not have to be maximized. In addition, water-activated batteries using sodium are made possible by the sodium electrode of the present invention due to its stability when submerged in water.

The sodium composite electrode 12 includes sodium metal having a protective metal dispersed therein. Protective metals include any metal which is compatible with sodium and is oxidized to form a protective film or coating around the metal. Suitable protective metals include aluminum, magnesium, zinc and alloys thereof. Aluminum is preferred.

The protective metal is added as a powder having particle sizes of between about 0.044 and 10 micrometers. The particle size distribution is controlled in order to minimize air reactivity and to maximize the space between the particles and thus maximize sodium retention in these spaces. The amount of protective metal powder added to the sodium may be varied. The amount added should be enough to convert the sodium into a "clay" which can be molded above 100° C. into a variety of electrode shapes or optionally be plastically extruded below 100° C. for ease of manufacture. Typically, up to about 60 weight percent of sodium is mixed with the protective metal and the excess sodium is compressed out, such that the clay mass will free stand and may easily be molded or extruded in a dry air environment into convenient shapes. Between about 25 to 55 weight percent of sodium after compression is preferred for the major portion of the electrode, to provide the desired activity. However, as discussed below, lower concentrations of sodium, as low as 10 percent, may be used on the surface of the electrode in order to maximize moisture protection.

Mixtures of powders and fibers which wet sodium may be used in conjunction with the protective metal to fine tune the electrode performance to the desired application. Such additives include metals and ceramics such as iron and its alloys, stainless steels, nickel, sodium conducting glasses, alumina, and beta-aluminas. When used in conjunction with the sodium composite "clay", the metal and ceramic additives modify the composite structure to produce novel characteristics in the electrode. The amount of metal or ceramic additives which are incorporated into the sodium composite "clay" will generally be less than about 10 weight percent. The exact amounts used for any given application can be easily determined experimentally.

The porous separator 16 is preferably made from a ceramic material such as silica fibers sintered into a porous mat such as is available from Lockheed Corp., Sunnyvale, California as FRCI-12 or HTP-12. Other suitable porous ceramic materials include zirconia or alumina felt and paper available from Zircar Products, Inc., Florida, New York. Zircar alumina felt and paper APA-1, APA-2 and APA-3 are especially preferable. The porous material should have sufficient porosity to allow preliminary migration of fluid (liquid or gaseous) sodium metal and fluid (liquid or gaseous) sulfur therethrough during initial operation of the battery to form a polysulfide electrolyte gradient. The term "preliminary migration" is used to mean the migration which occurs upon initial operation of the cell, in order to establish the polysulfide electrolyte gradient. Once this gradient is established, there is no longer free flow of the fluids; however, diffusion through the separator still occurs. As previously mentioned, the polysulfide electrolyte is believed to be in the form of a gradient having the composition $$Na_2S/Na_2S_2/Na_2S_3/Na_2S_4/Na_2S_5$$

Although the thickness of the porous separator 16 may be varied according to intended use, it is preferred that the thickness of the layer or mat be between 0.01 cm to 0.3 cm. Preferably, the layer will have a thickness of about 0.01 cm to 0.06 cm. Other conventional separators may be used in place of the preferred porous separator 16, if desired.

Operation of the sodium-sulfur thermal cell shown in FIG. 1 is carried out in accordance with conventional operating procedures for sodium-sulfur batteries. Typically, this involves heating of the cell to a temperature at which the sodium metal and sulfur are both liquids. This temperature is typically between 100° C. to 400° C. depending upon the pressure within the cell.

In general, generation of electrical current will take slightly longer when the cell in accordance with the present invention is heated for the first time due to the necessity for the liquid sodium and sulfur to migrate into the porous layer 16 for reaction and formation of the polysulfide electrolyte. Alternatively, the porous separator 16 may be pre-impregnated with a polysulfide (preferably $Na_2S_3$). Pre-impregnation of the porous separator 16 provides immediate turn-on of the cell once it reaches operating temperature.

An alternative electrolyte which may be impregnated into the porous separator 16 is sodium tetrachloroaluminate. Impregnation of the porous separator with sodium tetrachloroaluminate will provide a highly conductive electrolyte with good transport properties. Sodium tetrachloroaluminate is known to wet oxides and to solubilize not only the sodium polysulfides, but also sulfur to a lesser degree. The amount of sodium tetrachloroaluminate which should be impregnated into the porous separator will vary depending upon the maximum current density desired.

It should be noted that changes in the volume of materials in the compartments defined by the sodium and sulfur electrodes will occur on discharge. This is not normally a problem in conventional thermal batteries which operate for only brief periods. However, the present electrochemical cell will have an active operating time on the order of one hour or more. Material transport within the cell will be from the sodium composite anode 12 to polysulfides in the cathode 14. The result will be the filling of the graphite felt in the sulfur cathode 14. The net cell reaction can be considered to be:

$$2Na + 3S \rightarrow Na_2S_3$$

$Na_2S_3$ wets graphite felt, but not in preference to the liquid sulfur. Accordingly no extra separator material nor separator structures need be used to contain discharge reaction products. There will be a net increase in the material on the cathode side 14 of separator 16 and the sodium composite electrode side 12 of the cell will be depleted. However, the volume of material in the compartment on the sulfur cathode side of separator 16 will increase only slightly. Allowance is made for this slight volume increase by leaving some empty cathode volume during the initial filling of the cell with sulfur.

Figure 2:
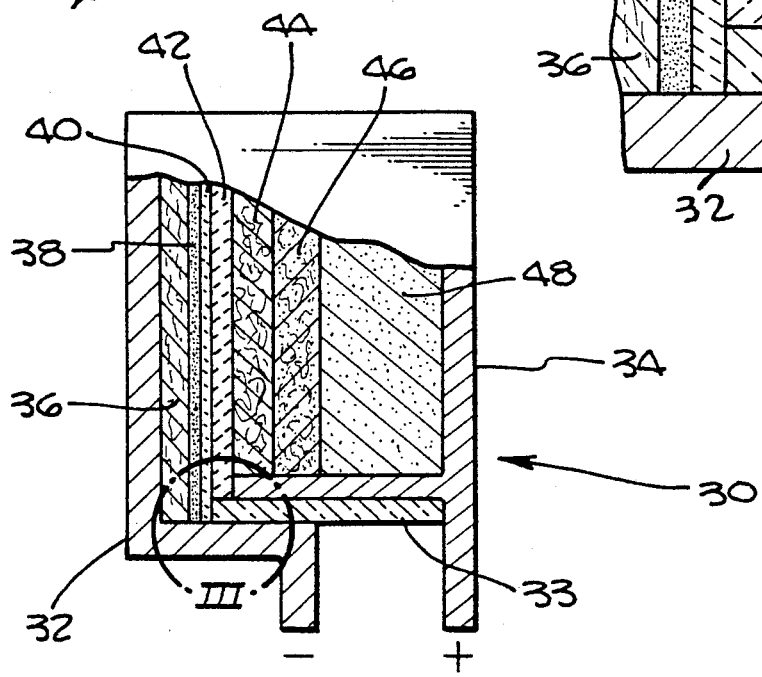
FIG. 2 is a partial sectional view of a preferred exemplary embodiment of the present invention.

An exemplary sodium-sulfur cell is shown at 30 in FIG. 2. The cell can be initially evacuated or provided with a small bleed hole in the cathode casing so that pressures in the cell are equalized at operating temperatures. The design in FIG. 2 minimizes pressure changes due to changes in the internal volume of reactant in the anode and cathode compartments during operation of the cell. Furthermore the specific design minimizes leakage of sulfur vapor around the edges of the separator layers and into the anode compartment due to any slight excess pressure in the cathode compartment. The cell 30 includes an aluminum anode current cup collector 32 and an aluminum cathode current cup collector 34. A layer of glass insulator 33 is provided to separate the collector cups. The anode is provided by a sodium-impregnated metallic wick 36 and a sodium composite electrode comprising sodium-impregnated aluminum powder 38.

The porous separator includes two layers 40 and 42. Although single layer porous separators are suitable, it is preferred that the porous separator include a layer 40 which is not impregnated with polysulfide and a layer 42 which is impregnated with a polysulfide such as $Na_2S_4$. The polysulfide impregnated layer 42 is preferably thicker than the other layer 40. In addition, multiple layers of three or more can be used if desired. For example, an additional non-impregnated porous layer may be placed on the side of impregnated layer 42 opposite from layer 40.

Two layers of graphite felt 44 and 46 are used to provide the sulfur cathode. These layers 44 and 46 may be impregnated with either sulfur or $Na_2S_5$. In addition, a graphite current collector 48 provides electrical contact between the graphite layers 44, 46 and the current collector cup 34.

Figure 4:
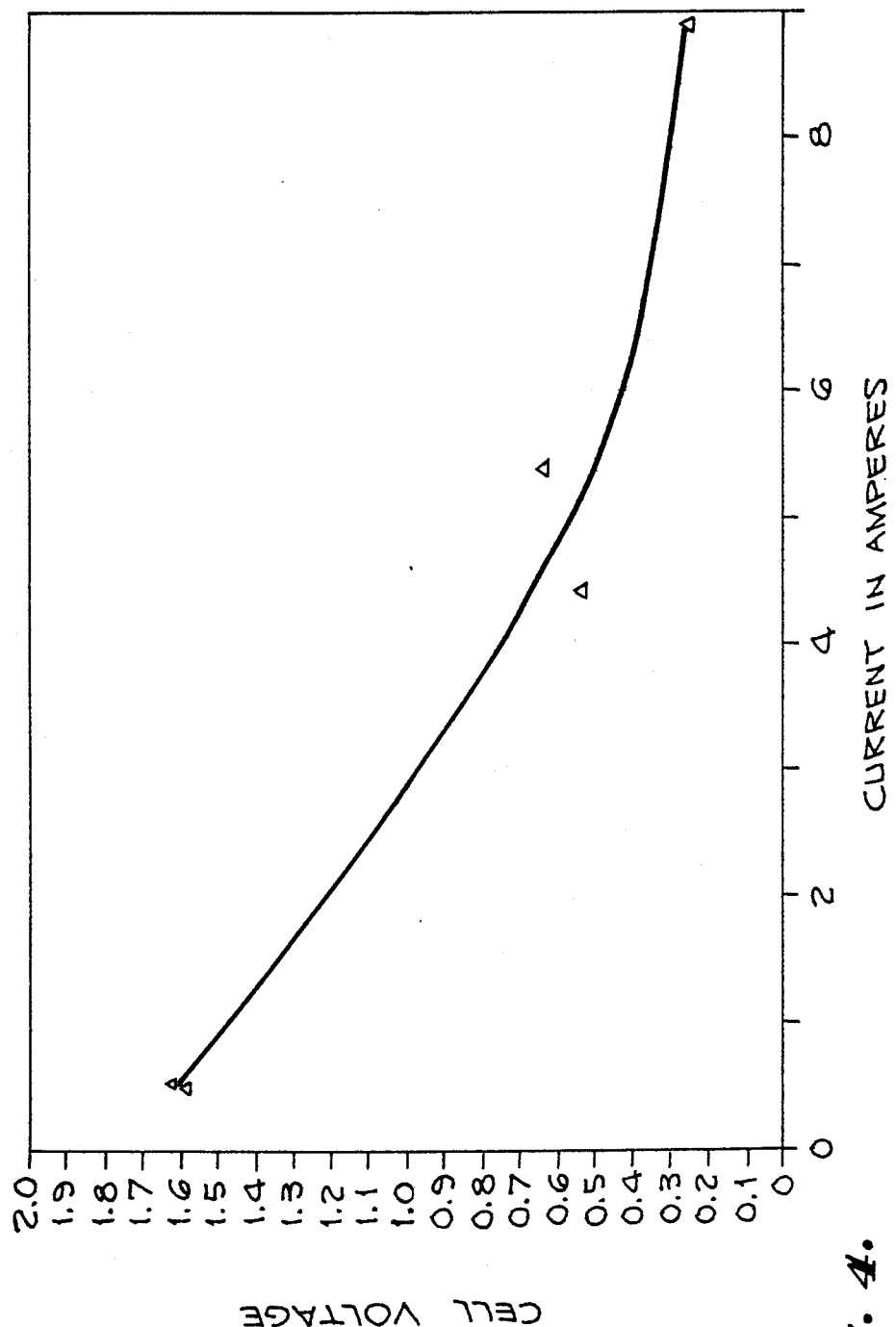
FIG. 4 presents a curve showing current versus voltage behavior at 330° C. for an exemplary sodium-sulfur cell in accordance with the present invention.

FIG. 4 presents a curve indicating the current versus voltage behavior at 330° C. for the sodium-sulfur cell in accordance with the present invention which was constructed as described in Example 2 herein. As indicated in the curve in FIG. 4, an unshorted current density of 1.11 A/cm$^2$ was obtained at 0.26 volts; and a maximum power density of 380 milliwatts/cm$^2$ is obtained at currents of 0.5 A/cm$^2$ and 0.76 volts.

In accordance with an alternative embodiment of the present invention, a sodium composite structure may be formed as described above from sodium metal and a chosen protective metal and may be used for purposes other than in a battery, such as in chemical reactions, where it is desirable to control the reactivity of sodium with oxygen or air and moisture. This structure thus allows sodium to be used in applications which were heretofore impractical due to the high reactivity of sodium with air and moisture. The structure may be formed to have any required free-standing shape. A preferred structure is formed from sodium and powdered protective metal, which forms a clay that is readily molded or extruded. Alternatively, a stacked structure may be formed to have different amounts of sodium from layer to layer. For example, a higher concentration of sodium may be used in the center of the structure and decreasing concentrations of sodium in one or more successive layers toward the surface of the structure. The surface of the stacked structure may comprise predominantly (up to 90%) protective metal, to provide maximized protection of the sodium on the surface exposed to the environment. The stacked structure is formed by depositing successive layers of mixtures containing sodium and protective metal in predetermined concentrations. The layers are compressed to bond them together. In these sodium composite structures, the maximum amount of sodium is preferably below about 60 percent. The relative amounts of sodium and protective metal are adjusted as required in order to form the desired structure and in order to provide the desired reactivity of sodium. A higher concentration of protective metal and/or the incorporation of finer particles of the protective metal at the surface of the structure may be used to minimize the reactivity of the sodium with air or moisture.

Examples of practice are as follows:

EXAMPLE 1

Figure 3:
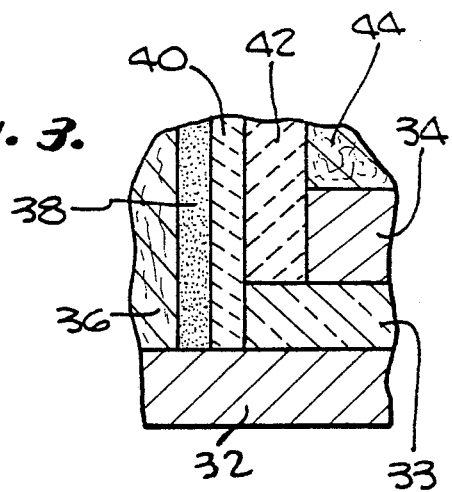
FIG. 3 is a detailed view of a portion of the exemplary sodium-sulfur cell shown in FIG. 2.

A cell having an 8.0 cm$^2$ electrode area was constructed of aluminum and graphite and consisted of a separator sealing arrangement and anode and cathode compartments as detailed in FIGS. 2 and 3. The graphite felt cathode structure 44 and 46 was filled with $Na_2S_3$ instead of sulfur, thereby relegating cell performance to that expected at the end of the cell discharge. The thickness of this cathode structure was about 0.6 cm.

The sulfur impregnated felt was prepared by compressing graphite felt into the end of a 5 mm SolvSeal ® flanged glass joint (obtained from Fischer and Porter of Warminster, Pennsylvania) and held in place by a plug of polytetrafluoroethylene containing a small hole. The joint was dipped in molten $Na_2S_3$ and, using a rubber bulb to provide suction, the $Na_2S_3$ was drawn into the graphite. A spiralled platinum wire was placed in the graphite felt and served as a current lead. Upon cooling, the polytetrafluoroethylene plug was removed.

The anode was made from disks having a diameter of about 0.7 cm which were punched out from Fibrex ® nickel felt having a thickness of about 0.5 cm. The Fibrex ® nickel felt was treated electrochemically to reduce the surface oxide. The nickel felt was placed in a glass tube equipped with a glass wool filter at one end and a rubber bulb at the other. Molten sodium was drawn through the glass wool filter into the tube and allowed to contact the nickel. The assembly was then heated until the disks were fully wetted by the sodium.

On top of the anode structure a sodium-aluminum "clay" 38 in FIG. 2, about 0.15 cm thick was manually pressed onto the surface of the sodium filled Fibrex ® felt 36. The "clay" was made in an inert gas glove box by the addition of molten sodium into an aluminum container holding 320 mesh pure aluminum powder. The mixture was mechanically mixed at 400° C. with enough sodium being added so the mass would free stand (approximately 30% by weight sodium) and when pressed, free sodium flowed.

The separator was made of two layers of Lockheed sintered silica HTP-12. Layer 40 was 0.05 cm thick and was manually pressed against the sodium "clay". The other HTP-12 layer 42 was 0.20 cm thick and had been filled with $Na_2S_3$ by placing the disk onto a pool of molten polysulfide in the glove box under nitrogen. Neither of the two layers had been baked out to remove moisture since it was discovered that rigorous drying impedes the wetting of the silica by polysulfides.

The assembled cell was heated in a way that kept the cathode temperature 70° to 80° C. above the anode temperature during cell operation. Because the cell was charged with $Na_2S_3$ instead of sulfur, the maximum OCV was 1.70 volts. The maximum short circuit current density obtained was only 0.19 A/cm$^2$.

EXAMPLE 2

The conditions of Example 1 were repeated except for the following changes. Layer 40 in FIGS. 2 and 3 was Zircar APA-2 alumina pretreated with a solution of $Na_2S_4$ in anhydrous ethanol and allowed to dry. This layer was 0.06 cm thick uncompressed but 0.03 cm thick when the cell was in the assembled, compressed state. Layer 40 was manually pressed onto the sodium "clay" 38 after the drying out of the ethanol. Layer 42 consisted of 3 layers of Zircar APA-3 alumina filled with $Na_2S_4$, 0.12 cm thick. Cathode structure 44 was $Na_2S_4$ filled graphite felt and layer 46 was sulfur filled graphite felt. The sodium anode compartment was placed on a hot plate and the top (cathode) side of the cell was separately heated. The performance is detailed in Table I and FIG. 4. An unshorted current density of 1.11 A/cm$^2$ was obtained at 0.26 volts; from the slope of the curve of FIG. 4 it is evident that higher current densities could have been obtained. The data in FIG. 4 indicate that a maximum power density of 380 mw/cm$^2$ is obtained at currents of 0.5 A/cm$^2$ and 0.76 volts. The maximum OCV from Table I is 1.96 volts which is consistent with the original mix of $Na_2S_4$ and sulfur. It is also evident that higher temperatures are required to maintain performance after 50 minutes, and that the cell performance cannot be maintained after 63 minutes.

TABLE I

Performance of 8-cm$^2$ Cell

| TIME MINS. | CELL TEMPERATURE (°C.) TOP | CELL TEMPERATURE (°C.) BOTTOM | OPEN CIRCUIT VOLTAGE, VOLTS | OPERATING VOLTAGE VOLTS | CURRENT, AMPERE |
| --- | --- | --- | --- | --- | --- |
| 3 | 85 | 150 | 0.10 | | |
| 5 | | | 0.50 | | |
| 6 | | | 1.77 | | |
| 7 | 221 | 265 | 1.80 | | |
| 9 | | | 1.93 | | |
| 10 | 230 | 262 | 1.96 | | |
| 10 | | | 1.96 | | |
| 16 | 254 | 279 | | 0.02 | 0.90 |
| 19 | | | | 0.06 | 1.00 |
| 22 | | | 1.64 | 1.10 | 0.35 |
| 24 | | | | 1.28 | 0.40 |
| 25 | 260 | 280 | | 1.58 | 0.50 |
| 30 | 306 | 329 | | 1.63 | 0.52 |
| 32 | | | | 0.26 | 8.90 |
| 33 | 330 | 355 | | 0.64 | 5.40 |
| 34 | | | | 0.54 | 4.40 |

TABLE I-continued

Performance of 8-cm² Cell

| TIME MINS. | CELL TEMPERATURE (°C.) TOP | BOTTOM | OPEN CIRCUIT VOLTAGE, VOLTS | OPERATING VOLTAGE VOLTS | CURRENT, AMPERE |
|---|---|---|---|---|---|
| 34 | | | | 1.60 | 0.50 |
| 42 | | | 1.79 | | |
| 43 | | | | 1.58 | 0.50 |
| 43 | | | | 0.21 | 1.66 |
| 44 | 330 | 355 | | 0.16 | 1.20 |
| 46 | | | | 0.21 | 1.40 |
| 48 | | | | 0.22 | 1.80 |
| 50 | 350 | 425 | | 0.45 | 3.45 |
| 51 | | | | 0.40 | 3.00 |
| 51 | | | | 1.48 | 0.48 |
| 51 | | | 1.48 | | |
| 52 | | | 1.61 | | |
| 53 | | | 1.70 | | |
| 53 | | | | 1.45 | 0.48 |
| 55 | | | | 1.44 | 0.48 |
| 55 | 349 | 430 | | 0.23 | 1.70 |
| 61 | 349 | 430 | | 0.35 | 3.00 |
| 63 | | | | 0.35 | 3.00 |
| 64 | | | | 0.11 | 0.80 |
| 72 | | | | 0.11 | 0.80 |
| 72 | | | 0.32 | | |
| 78 | | | 0.38 | | |
| 78 | | | | 0.03 | 1.10 |
| 79 | | | | 0.03 | 1.10 |
| 80 | | | 0.35 | | |
| 85 | | | 0.35 | | |

EXAMPLE 3

The conditions of Example 2 were repeated except for the following changes. Both cathode structures 44 and 46 were impregnated with an equimolar mixture of sulfur and sodium chloroaluminate. Separator layer 40 was Zircar APA-3 treated twice with a saturated solution of $Na_2S_4$ in anhydrous ethanol, 0.04 cm thick. Layer 42 was two layers of APA-3 filled with sodium chloroaluminate, 0.08 cm thick. At 225° C., the cell OCV was 2.4 volts. The best performance which could be obtained was 0.125 A/cm² at 0.2 volts. In order to obtain this performance the cell pressure was increased by tightening the cell bolts. The cell continued to operate with gradually declining performance for 160 minutes before the heat was turned off. The following day, the cell continued to operate on reheating at the performance level of the previous day.

As can be seen from the above examples, the use of a porous separator in combination with a polysulfide gradient located therein provides an electrolyte/separator configuration which adequately separates the liquid electrodes in a sodium-sulfur thermal cell while at the same time allowing high ionic conductivity. This combination of features will be especially useful in those situations where continuous high power output is required over time periods ranging from a few minutes to a number of hours.

The preferred sodium sulfur battery does not use a ceramic electrolyte and thus overcomes the previously noted prior art problems. The battery incorporating the sodium composite electrode is easily manufactured because of the protection provided by the aluminum powder. Further, the battery is rugged and is expected to have an indefinite shelf life. Once activated, it must be discharged within several hours, since it will completely self-discharge within approximately six hours, the time depending on the particular battery structural design and temperature. The battery has a long shelf-life, and is a rugged, high power density primary battery with discharge times ranging from seconds to several hours depending upon the application requirements and the battery design used to meet those requirements. These applications are presently best met by known thermal batteries such as the $Li/FeS_2$ or $CaCrO_4$ batteries. Possible advantages of this invention over existing thermal batteries would be higher power densities and longer discharge times.

The battery incorporating the sodium composite electrode of this invention is also rechargeable and can be used as a secondary battery for those applications not requiring long discharge times or charging times. The battery can be readily deactivated by cooling, and then reactivated by heating, unlike some thermal batteries and the state-of-the-art solid electrolyte sodium-sulfur secondary battery. The latter must be carefully cooled and reheated in order to prevent fracture of the solid electrolyte. While the discussion and examples herein are directed toward the use of this invention as a primary thermal battery, experimental evidence does prove the rechargeability and ease of thermal deactivation and reactivation of the battery of the present invention. Thus, the present invention may also be used as a secondary battery.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A thermal battery for generating electrical energy, said battery comprising:
    (a) a sodium composite electrode comprising sodium metal and a protective metal;
    (b) a cathode; and (c) a separator located between said sodium composite electrode and said cathode.

2. A thermal battery according to claim 1 wherein said protective metal is selected from the group consisting of aluminum, magnesium, zinc and alloys thereof.

3. A thermal battery according to claim 2 wherein said protective metal is aluminum.

4. A sodium composite electrode for use in a thermal battery, said electrode comprising sodium metal and a protective metal.

5. A sodium composite electrode according to claim 4 wherein said protective metal is selected from the group consisting of aluminum, magnesium, zinc and alloys thereof.

6. A sodium composite electrode according to claim 5 wherein said protective metal is aluminum.

7. A sodium composite electrode according to claim 6 wherein said protective metal is a powder.

8. A sodium composite electrode according to claim 4 which further includes a metal additive or ceramic additive.

9. A sodium composite electrode according to claim 8 wherein said metal additive is selected from the group consisting of iron, stainless steel, nickel and alloys thereof.

10. A sodium composite electrode according to claim 8 wherein said ceramic additive is selected from the group consisting of sodium-conducting glasses, alumina and beta aluminas.

11. A sodium-sulfur thermal battery for generating electrical energy at temperatures above the melting point of sodium metal and sulfur, said battery comprising:

(a) a sodium composite electrode comprising sodium metal and a protective metal;

(b) a sulfur electrode comprising sulfur; and (c) a separator located between said sodium and sulfur electrodes, said separator having sufficient porosity to allow preliminary migration of fluid sodium metal, fluid sulfur and fluid sodium polysulfides therethrough during operation of said thermal battery to form a mixed polysulfides electrolyte gradient within said separator.

12. A sodium-sulfur thermal battery according to claim 11 wherein said protective metal is aluminum.

13. A sodium-sulfur battery according to claim 11 wherein said sodium composite electrode further includes a metal additive or ceramic additive.

14. A sodium-sulfur thermal battery according to claim 11 wherein said sulfur electrode comprises a sulfur wettable wick impregnated with sulfur.

15. A sodium-sulfur thermal battery according to claim 11 wherein said separator comprises a porous oxide material.

16. A sodium-sulfur thermal battery according to claim 15 wherein said porous oxide material is selected from the group consisting of silica, alumina and zirconia.

17. A sodium-sulfur thermal battery according to claim 11 wherein said separator is impregnated with a polysulfide electrolyte.

18. A sodium-sulfur thermal battery according to claim 11 wherein said separator is impregnated with sodium chloroaluminate.

19. A sodium-sulfur thermal battery according to claim 11 wherein said separator includes a plurality of layers.

20. A sodium-sulfur thermal battery according to claim 19 wherein the layer of said separator which is closest to said sulfur electrode is impregnated with a polysulfide.

21. A sodium metal electrode adapted for use in a thermal battery, wherein the improvement comprises adding a sufficient amount of protective metal to said sodium metal to provide protection of said sodium metal electrode from reaction with water or air.

22. An improved sodium metal electrode according to claim 21 wherein said protective metal is selected from the group consisting of aluminum, magnesium, zinc and alloys thereof.

23. An improved sodium metal electrode according to claim 22 wherein said protective metal is aluminum powder.

24. An improved sodium metal electrode according to claim 21 further including a metal additive or ceramic additive.

25. A sodium composite structure comprising sodium metal and a protective metal that reduces the reactivity of said sodium with oxygen and moisture.

26. A sodium composite structure according to claim 25 wherein said protective metal is selected from the group consisting of aluminum, magnesium, zinc, and alloys thereof.

27. A sodium composite structure according to claim 25 wherein said sodium comprises up to about 60 weight percent of said composite.

28. A sodium composite structure according to claim 25 wherein said protective metal comprises a powder and said composite comprises a clay.

29. A structure comprising multiple layers of said sodium composite structure of claim 25 wherein adjacent said layers comprise different amounts of said sodium.

30. A structure according to claim 29 wherein said layer or layers exposed to air comprises up to about 90 weight percent of said protective metal.

* * * * *

UNITED STATES PATENT AND TRADEMARK OFFICE
CERTIFICATE OF CORRECTION

PATENT NO. : 4,968,568

DATED : November 6, 1990

INVENTOR(S) : LIN R. HIGLEY

It is certified that error appears in the above-identified patent and that said Letters Patent is hereby corrected as shown below:

Cover page, Title, second line,
   Delete "ANODE" and insert therefor --ELECTRODE--.

Signed and Sealed this

Twelfth Day of May, 1992

Attest:

DOUGLAS B. COMER

Attesting Officer

Acting Commissioner of Patents and Trademarks